United States Patent [19]

Van Steenbrugge

[11] Patent Number: 5,650,775
[45] Date of Patent: Jul. 22, 1997

[54] CONTROL SYSTEM FOR CONTROLLING CONSUMER APPARATUS

[75] Inventor: Bernard Van Steenbrugge, Eindhoven, Netherlands

[73] Assignee: U.S. Philips Corporation, New York, N.Y.

[21] Appl. No.: 416,944

[22] Filed: Apr. 4, 1995

Related U.S. Application Data

[63] Continuation of Ser. No. 954,737, Sep. 30, 1992, abandoned, which is a continuation-in-part of Ser. No. 668,804, Mar. 7, 1991, abandoned, which is a continuation of Ser. No. 430,399, Oct. 31, 1989, abandoned.

[30] Foreign Application Priority Data

Jul. 6, 1989 [EP] European Pat. Off. .............. 89201789

[51] Int. Cl.$^6$ ........................................................ H04J 3/02
[52] U.S. Cl. ........................ 340/825.24; 340/825.52; 340/825.56; 455/4.1
[58] Field of Search ...................... 340/825.06, 825.07, 340/825.24, 825.25, 825.44, 825.52, 825.69, 825.72; 348/725–729; 455/4.1, 230, 352, 151.1–151.4

[56] References Cited

U.S. PATENT DOCUMENTS

| | | | |
|---|---|---|---|
| 4,274,082 | 6/1981 | Litz et al. | 340/825.57 |
| 4,429,384 | 1/1984 | Kaplinsky | 370/85 |
| 4,496,947 | 1/1985 | Nakashima et al. | 348/734 |
| 4,718,011 | 1/1988 | Patterson, Jr. | 340/825.54 |
| 4,718,112 | 1/1988 | Shinoda | 455/151.4 |
| 4,743,968 | 5/1988 | Mogi et al. | 348/725 |
| 4,746,919 | 5/1988 | Reitmeier | 340/825.54 |
| 4,817,203 | 3/1989 | Tsurumoto et al. | 455/603 |
| 4,855,730 | 8/1989 | Venners et al. | 340/825.24 |
| 4,885,730 | 12/1989 | Venners et al. | 340/825.24 |
| 4,896,349 | 1/1990 | Kubo et al. | 379/107 |
| 5,107,256 | 4/1992 | Ueno et al. | 340/825.52 |
| 5,128,668 | 7/1992 | Ibezaki et al. | 340/825.72 |
| 5,287,520 | 2/1994 | Kaiser | 340/825.06 |

*Primary Examiner*—Michael Horabik
*Assistant Examiner*—William H. Wilson, Jr.
*Attorney, Agent, or Firm*—Bernard Franzblau

[57] ABSTRACT

A control system for controlling consumer apparatus. In the system, a command item is generated in one apparatus and supplied to another apparatus via a bus. The command item includes an operation code followed by zero or more operand codes for, in an addressee apparatus, addressing a command table. The latter thereupon outputs appropriate information for the addressee apparatus, without the addressor apparatus needing to specify the latter information.

40 Claims, 2 Drawing Sheets

FIG. 1

| | | | ADDRESS BYTE | | | | | | | | | | | | | | |
|---|---|---|---|---|---|---|---|---|---|---|---|---|---|---|---|---|---|
| | | | | 0 | 1 | 2 | 3 | 4 | 5 | 6 | 7 | 8 | 9 | A | B | C | D | E | F |
| | | | | 0000 | 0001 | 0010 | 0011 | 0100 | 0101 | 0110 | 0111 | 1000 | 1001 | 1010 | 1011 | 1100 | 1101 | 1110 | 1111 |
| OPERAND CODES OPR | RESERVED | 0 | 0000 | R | | | | | | | | | | | | | | | |
| | | 1 | 0001 | R | R | | | | | | | | | | | | | | |
| | CONTROLLING VALUES | 2 | 0010 | | | ASCII | | | | | | | | | | | | | |
| | ASCII CHAR CODES | 3 | 0011 | | | | | | | | | | | | | | | | |
| | | 4 | 0100 | | | | | | | | | | | | | | | | |
| | VALUES ALIAS | 5 | 0101 | | | | | | | | | | | | | | | | |
| | STD. OPER. VALUES | 6 | 0110 | | | | | | | St | | | | | | | | | |
| | | 7 | 0111 | | | | | | | | St | | | | | | | | |
| OPERATION CODES OPC | RESERVED | 8 | 1000 | | | | | | | | | R | | | | | | | |
| | | 9 | 1001 | | | | | | | | | | R | | | | | | |
| | GENERAL COMMANDS | A | 1010 | | | | | | | | | | | Gen | | | | | |
| | | B | 1011 | | | | | | | | | | | | Gen | | | | |
| | GROUP FUNCTION COMMANDS | C | 1100 | | | | | | | | | | | | | Fu Gr | | | |
| | | D | 1101 | | | | | | | | | | | | | | Fu Gr | | |
| | SPECIFIC FUNCTION COMMANDS | E | 1110 | | | | | | | | | | | | | | | Fu Sp | |
| | | F | 1111 | | | | | | | | | | | | | | | | Fu Sp |

MOST SIGNIF. NIBBLE

LEAST SIGNIF. NIBBLE

FIG. 2

CONTROL SYSTEM FOR CONTROLLING CONSUMER APPARATUS

This is a continuation of application Ser. No. 07/954,737, filed Sep. 30, 1992, abandoned which is a continuation-in-part of application Ser. No. 07/668,804, filed Mar. 7, 1991, abandoned, which is a continuation of application Ser. No. 07/430,399, filed Oct. 31, 1989, abandoned.

BACKGROUND OF THE INVENTION

1. Field of the Invention

This invention relates to a control system for controlling consumer apparatus, in particular audio and/or video apparatus. Various such apparatus have been in general use, the control signals thereof being formatted as a bit stream, the bit stream specifying a qualitative operation mode and/or quantitative operation settings.

2. Description of the Related Art

A control system of the kind described is disclosed in U.S. Pat. No. 4,937,816, assigned to the same assignee as the present application, herein incorporated by reference. The general trend in consumer service systems is to integrate an arbitrary selection of consumer apparatuses to function collectively. The interaction may be on a control level in that a first apparatus only controls the function of a second apparatus. Alternatively, the user function also is fulfilled by the combination, for example, in that one apparatus is a broadcast tuner for receiving a particular signal and a second apparatus is a recorder for the signal so received. In general, the various apparatuses in the system may be of various different types, even when fulfilling the same function, and also of various manufacturers. Thus, in principle, each apparatus could require its own particular mode/operation settings that could be expressly non-standard.

SUMMARY OF THE INVENTION

Among other things, it is an object of the present invention to relieve any control command generating entity outside any apparatus so controlled from the need to expressly specify operation mode and/or operation settings for the latter apparatus.

According to one of its aspects, the invention thereto provides a control system for controlling distributed consumer apparatus, the system having a command generating means for generating a command item for an apparatus in the system, the command item being structured as a string of an operation code followed by a set of command operand codes, for, under control of the operation code, accessing a local command table of an apparatus so addressed, the local command table containing a first address range for storing general commands, and a second address range for function group commands.

The invention also relates to a consumer apparatus for use in such a system and comprising receiving means for transporting any command item between the command generating means and any apparatus so addressed.

BRIEF DESCRIPTION OF THE DRAWINGS

The invention will be further explained with respect to the accompanying figures that show a preferred embodiment.

DESCRIPTION OF THE PREFERRED EMBODIMENT

Figure 1:
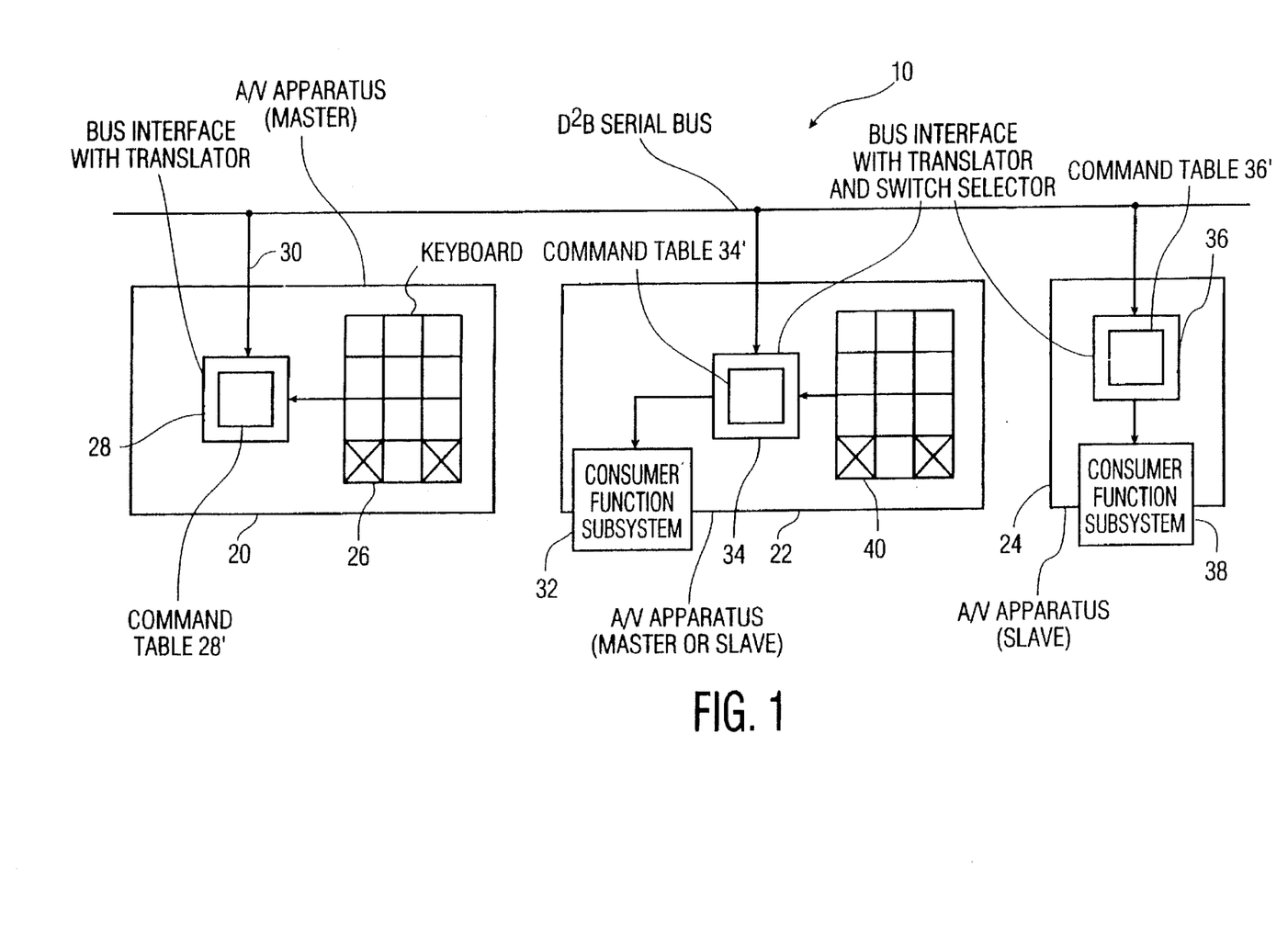
FIG. 1 is a block diagram of an elementary system according to the invention.

FIG. 1 is a block diagram of an elementary system 10 according to the invention. It has three audio/video (A/V) apparatuses 20, 22, 24 and, by way of example, is coupled to an audio system. Likewise, system 10 may comprise a video system, a mixed audio-video system (A/V) or may comprise other consumer system functions, such as lighting/environment control systems, food preparation systems or other systems. Apparatus 20 is a controller-only master unit. It has a keyboard 26 with 12 keys as shown; the keycode conventionally may be translated to a control byte in translator 28 that also comprises an interface to serial bus 30, to which A/V apparatus 20 functions as a master station. The bus definition may be according to a so-called known $D^2B$ format as specified in U.S. Pat. No. 4,429,384, assigned to the same assignee as the present invention and incorporated by reference herein. Apparatus 24 may, by means of subsystem 38, operate the desired consumer function, such as operating a tuner, a turntable, a recorder, or other function of that apparatus. Of course, two different apparatuses could cooperate with respect to their consumer function, in that a first apparatus is a tuner, a second is a recorder or loudspeaker system, and so on. Other, and more complicated situations have been omitted for clarity. For this cooperation, the associated apparatuses will often exchange data, such as digitized audio, along high-speed links not shown. Apparatus 24 receives from the serial bus 30 formatted operation codes and/or commands such as apparatus 20 or 22 operand codes, and/or data items and/or request codes from other master A/V apparatuses. These codes each translate into information, i.e., an address, that is specific to audio/video (A/V) apparatus 24, preferably by translating in translator 36, which thereto functions as a bus interface containing a command table to be specified infra. The translated address addresses that local command table. With respect to serial bus 30, apparatus 24, in general, functions as a slave station that reacts to apparatus 20's output control signals. Master and slave stations are generally shown, for example, in the aforementioned U.S. Pat. No. 4,937,816.

Apparatus 22 has both a user function subsystem 32 and a keyboard 40. Apparatus translator 34 functions as a bus interface and comprises a command table and may, with respect to bus 30, operate either as a master or a slave. In principle, the system can operate in various configurations, for example, as follows:

1. A/V apparatus 22 functions independently under local control;
2. A/V apparatus 20 (master) controls A/V apparatus 24 (slave);
3. A/V apparatus 22 (master) controls A/V apparatus 24 (slave);
4. A/V apparatus 20 (master) controls both A/V apparatuses 22 and 24 (slaves).

The above system 10 is given merely by way of example. The apparatuses 20, 22 and 24 may be different or more numerous, interaction patterns may be more complex, keyboards may be replaced by function-assigned key sets, the system 10 as a whole may operate as a subordinate system to a higher level system, and many other variations would not render it incommensurate to the present invention.

The source apparatus, e.g., apparatus 20, generates via command table 28', a sequence of addresses, and three different address ranges, i.e., address general commands, function group commands, and function specific commands, as stored in the local command table of the destination apparatus, for example, apparatus 24. There are several levels of technology involved in this communication:

(a) The bit-level of the message may be the known $D^2B$ system;

(b) the byte-organized structure of the message is known from U.S. Pat. No. 4,429,384;

(c) the structure of the command table itself which is disclosed herein; and (d) what the effective commands mean as described herein by way of example.

In particular, the present invention provides an uncoupling between a user-specified function, and the implementation by the destination apparatus. The source apparatus receives a specific command via its keyboard and the destination apparatus (when addressed) according to its functionality, operates according to the command of its addressed table.

Apparatus 20 is a controller-only device. It may control only remote apparatuses such as apparatus 22 or 24. Apparatus 22 may be locally controlled, controlled by apparatus 20 or it may control apparatus 24. The control is implemented by a user via the appropriate keyboard. In apparatus 20, translator 28 receives the key-code (such as 1-out-of-10), translates this to a control byte (such as BCD or Hex) and formats the bus message. Keyboard 26, via translator/bus interface 28 and the bus interface 34, may access the local command table of apparatus 22. The command table is located in the bus interface 34 of the addressed destination. An appropriate command string instruction, FIG. 2, comprising operands (OPR) and operation codes (OPC), at the addressed location of the table 28', is outputted from that table and applied to the bus 30. The command string is then read by a second message receiving apparatus, e.g., apparatus 24 command table 36' of translator 36, which translates that received encoded string into a table address of table 36'.

The addressed table 36' then generates a local command for operating that audio/video (a/v) apparatus 24 according to the outputted command from table 36'. The addressing is via the standard device addressing on the bus. In the destination device, the addressing of the command table is unconditional. The addressing of a non-functional table location is signalled by a particular code. The meanings of terms "general commands", "group function commands", and "function specific commands" are explained below based on the operation code generated at the time for group function commands by that specific apparatus, e.g., apparatus 24. The function specific commands are directed to that particular selected apparatus. These commands are stored in and generated by table 28' of that apparatus in response to the user selected keys of keyboard 26.

The command table is located at the destination apparatus and, therefore, does not contain bus routing and bus protocol information with respect to the message sent by the source device. $D^2B$ bus routing is handled by straight addressing, either of the destination apparatus directly, or via one or more intermediate gateway or switch box devices. $D^2B$-protocol has a path-finding feature so that any apparatus would thereafter know how to route the message to a particular destination apparatus. However, the target apparatus may be (on the $D^2B$ bus) a gateway with a different bus at its other side. In that case, the routing comes into play, in that it would apply to this other bus.

The standard codes of the tables below, representative of a destination or source apparatus table, are self explanatory and are contained in table 28' (or table 34' of master apparatus 22). The specific command to a given apparatus is encoded into different messages as determined by the particular location addressed in table 28'. The different commands function are shown in more detail in the table below. The commands include bus protocols or specific addresses as needed. There is a default table in case no table selector is specified. A table selector code addresses a specific table for a given desired set of instructions. The general commands include table selector commands. Particular command tables are addressed by the avc-table-selector command. These commands are generated by the OPC portion of the code in the master table, e.g., table 28' of apparatus 20. Of course, the specific command is selected by the user via keyboard 26 which addresses a given address of that table 28'. Command extension codes, as shown in more detail in the table below, relate to specific operations, e.g., contrast in a video display, volume for an audio signal, mode, band, zoom and so on as listed herein.

Data information can be sent by data command messages. Review of the below table shows the more complete nature of the various codes and instructions contained in a given apparatus command table, it being understood that such a table may comprise sub-tables as well. A master station will have certain commands not included in a slave apparatus because of the more limited functions of the slave. The command table, e.g., table 28', includes a plurality of tables which are generally referred to by the tables shown in more detail below herein. Because of this multiple table arrangement, a table selector code as explained above is needed to address a sub-table of a give apparatus. For example, the brand name of a given apparatus, a plug number in that apparatus, or other apparatus specific information is included in a sub-table for a given apparatus. For this reason, a command table includes apparatus specific information addressable only to that apparatus or relating to a given part of that apparatus. Necessarily, the particular address of a sub-table is predetermined for the system, i.e., the tables for every apparatus includes specific OPC codes directed to a given target apparatus command table address. The target apparatus receiving that code responds accordingly.

As indicated in more detail below, all static and dynamic properties and characteristics of an apparatus are modelled in a property memory of the table of each such apparatus. The important aspect is that each apparatus contains a self contained encoded description of itself via its command table so as to be responsive to an appropriately addressed command from a master apparatus so as to perform the command function. As shown, an apparatus may be a slave, a master or a master and slave depending on the commands contained in its command table and the nature of that apparatus. Certain apparatuses are typically only slaves, for example, a video disc player, while others may be both, for example, a video cassette recorder. By storing command strings in the command table of each apparatus, a hook up of that apparatus to the system automatically couples it for operation as master and/or slave as desired based on the stored command structure according to the instruction scheme outlined below. The following command code description is in quasi-code format and is self explanatory. As a result, the present invention provides systematic organization between control system categories, while retaining flexibility. The source apparatus need only have partial information regarding the destination apparatus. The interconnection functions are fully standardized regardless of the type of apparatuses used.

Figure 2:
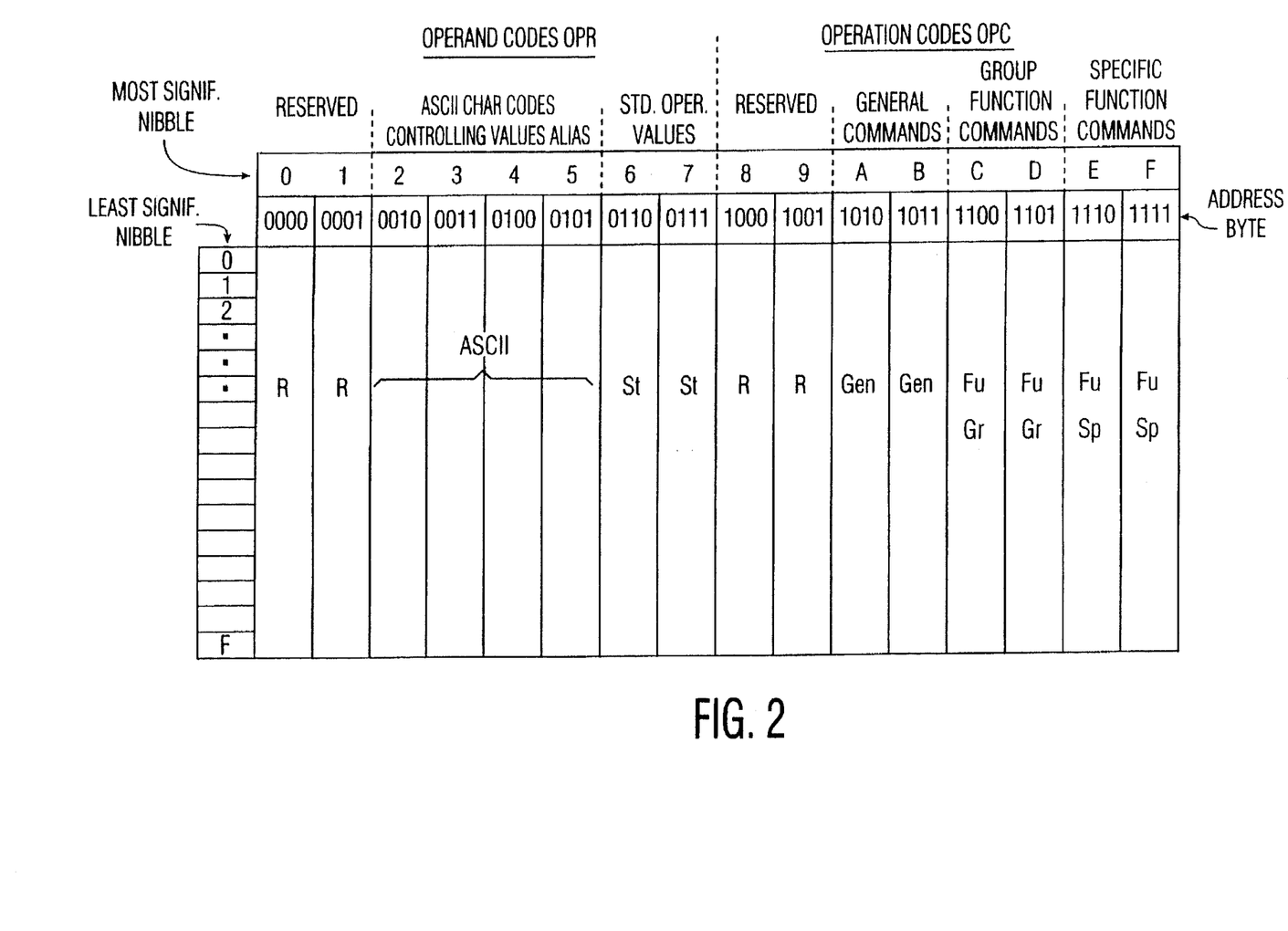
FIG. 2 is a diagram of a command table.

FIG. 2 is a diagram of a command table used in the interfaces 28, 34 and 36 of FIG. 1. The table may be a read-only memory, a random-access read-write memory, a combination of the two or be embodied in a software program. For accessing the table, first the appropriate apparatus 20, 22 or 24 is addressed, for example, in that a prospective master station, e.g., apparatus 20 grabs the bus 30 and produces a message directed to the intended slave station, i.e., apparatus 22 or 24. Now, as shown, the table comprises 256 entries (i.e. 16×16) of 1 byte each. Addressing by a most significant nibble of an address byte, shown at the top (0 . . . F), and by a least significant nibble of an address byte, shown at the left (0 . . . F). Conventionally, nibbles have four bits. The table of FIG. 2, from left to right, comprises the following sixteen columns: 0–1:reserved (R); 2–5: ASCII character codes or controlling values or Alias; 6–7: standard operand values (ST); 8–9: reserved (R); A–B: general commands (GEN); C–D: functional group commands (FuGr); E–F: function specific commands (FuSp). Within each column, sixteen locations are available. Generally, operands (OPR) fill the left half of the table, operation codes (OPC) fill the right half of the table.

DESCRIPTION OF THE COMMAND STRUCTURE

A command consists of an operation code (OPC) which contains information on where the appropriate commands are located (not their values) and a set of operand codes An OPC has a length of one byte, and is followed by zero or one or more OPR bytes. The OPC includes general commands, function group commands and function specific commands. The operand specifies the operation which is indicated by the operation code. The operand can be any one out of 32 dedicated (standard operands per Table 1 as follows:

TABLE I

ASCII value
Controlling value.
The OPR codes are defined as follows:
```
<opr>                    ::= <General-purpose-operands>
                           | <Standard-operands>
                           | <Routing operands>
<general-purpose-        ::= <ASCII '20'H . . . '5F'H)>
  operands>                | <ALIAS '20'H . . . '5F'H)>
                           | <CONTROLLING VALUE
                             '20'H . . . '5F'H)>
<standard-operands>      ::= <OFF                '60'H>
                           | <CLEAR/RESET        '61'H>
                           | <ENTER              '62'H>
                           | <DECREMENT          '63'H>
                           | <INDICATOR OFF      '64'H>
                           | <REVERSE            '65'H>
                           | <REPEAT             '6E'H>
                           | <STANDARD POSITION  '6F'H>
                           | <ON                 '70'H>
                           | <SET                '71'H>
                             0{<ASCII>}n
                           | <OPEN               '72'H>
                           | <INCREMENT          '73'H>
                           | <INDICATE           '74'H>
                           | <FORWARD            '75'H>
                           | <STILL              '76'H>
```
where "::=" means "the left hand term is defined by the right hand term"; "l" means "or"; "'H'" indicates hexadecimal notation for addressing a table in memory of the destination apparatus.

DESCRIPTION OF THE MESSAGE STRUCTURE

The syntax of an application message is as follows:

TABLE II

```
<application-frame-message>  ::= 1{<application-message>}n
<application message>        ::= <command-message>
                                | <command-data-message>
                                | <request-message>
<command-message>            ::= <COMMAND-LOCK-TYPE>
                                 <command-sequence>
<command-data-message>       ::= <COMMAND-LOCK-TYPE>
                                 <data-command>
                                 <DATA-LOCK-TYPE>
                                 <DATA-BYTES>
<request-message>            ::= <WRITE-PROPERTY-MEMORY-
                                 LOCK-TYPE><request>
                                 <READ-DATA-LOCK-TYPE>
                                 <property>
<end-message>                ::= <WRITE-COMMAND-UNLOCK-
                                 TYPE>
                                 <END       'BE'H>
<Command sequence>           ::= 1{<commands>}n
                                | <routing commands>
                                  1{<command>}n
``` where "1{ . . . }n" means a sequence of one or more items as recited between the brackets.

The data-commands fulfill the rules as specified for the command sequence and specify the context of the following data. A command is a combination of an OPC and 1 or more OPR codes. The OPC is to be used as a delimiter between 2 commands. The Commands are ordered in 3 groups:

General commands with same meaning for all functions;

Group Function commands with same meaning for a group of functions; and

Specific Function commands with valid meaning for the specified function.

The commands are defined as follows:

TABLE III

```
<command>          ::= <opc>1{<opc>}n
<opc>              ::= <general-command    'A0'H . . . 'BA'H>
                     | <command-extension  'BF'H>
                     | <group-function-command 'C0'H . . . 'DF'H>
                     | <specific-function-command
                       'E0'H . . . 'FF'H>
<routing-command>  ::= <bus-routing-command>
                     | <subdevice-routing-command>
<bus-routing-command> := <begin-0-command>
                     | <begin-1-command>
```

TABLE III-continued

| | |
|---|---|
| <subdevice-routing-command> | ::= <begin-2-command> |
| <begin-0-command> | ::= 'BB'H <BEGIN-0-OPR><sa-0'> |
| | \| 'BB'H <BEGIN-0-OPR><da-0'> |
| <begin-1-command> | ::= 'BC'H <BEGIN-1-OPR> 0{<sa'>}1 |
| | 0{<da'>}1 0{<ssda>}1 0{<dsda>}1 |
| <begin-2-command> | ::= 'BD'H <BEGIN-2-OPR>0{<ssda>}1 |
| | 0{<dsda>}1 |
| <sa-0> | ::= <gateway-name><$D^2$B-ADDRESS> |
| <da-0> | ::= <gateway-name><$D^2$B-ADDRESS> |
| <gateway-name> | ::= <1-nibble-CODE> |
| <sa'> | ::= <DEVICE-NAME><reserved-bit (=1)> |
| | <SERVICE NUMBER> |
| <da'> | ::= <DEVICE-NAME><reserved-bit (=1)> |
| | <SERVICE NUMBER> |
| <ssda> | ::= <SUB-DEVICE-NAME><SUB-DEVICE-NUMBER> |
| <dsda> | ::= <SUB-DEVICE-NAME><SUB-DEVICE-NUMBER> |

SA', DA', SSDA and DSDA are using all 8 bits of the byte.

Herein a gateway-name indicates an in-bus interface that interconnects two buses having the same or different protocol specifications. In particular, -begin 1- indicates that the bus protocol at the far-side of the interface either conforms to IHS Eureka or to the Japanese Home bus. For brevity, the associated bus protocols have not been repeated here.

The command -begin 2- is intended for within an apparatus specifying a subdevice, such as tuner function in a video cassette recorder.

TABLE IV

| | |
|---|---|
| <general-command> | ::= <STANDBY-command> |
| | \| <CONTROL-command> |
| | \| <PROGRAM-command> \| . . . |
| | . . . \| <SCC-TABLE-SELECTOR-command> |
| | \| <CT-TABLE-SELECTOR-command 'B7'H> |
| | \| <HK-TABLE-SELECTOR-command 'B8'H> |
| | \| <avc-table-selector-command 'B9'H> |
| | \| <COMMAND-EXTENSION-command> |

In the above, arc indicates audio-video control, CT means communication/telecom, HK means house keeping, SCC means System Common Command. Capital letters indicate that for brevity, no further specification has been given, small letters indicate that such specification is to follow. The System Common Commands, CT-TABLE-SELECTOR, HK-TABLE-SELECTOR and avc-table-selector each select one of the group-function or specific-function commands, one table selector for each service. In case no table selector is specified, a default table, provided for that type of destination apparatus, is used. Each apparatus has a default table for its specific apparatus category.

The following are examples of Group Function and Specific Function commands for a video camera and audio and video tuners as well as player commands for different kinds of players and other functions:

TABLE V

| Group Function commands | Specific Function commands | Type of destination (sub) device |
|---|---|---|
| video commands | | video monitor |
| video commands | | video effector |
| video commands | camera commands | video camera |
| audio commands | | audio amplifier |
| audio commands | | audio effector |
| deck/player commands | | video tape recorder |
| deck/player commands | | video disk player |
| deck/player commands | | audio disk player |

TABLE V-continued

| Group Function commands | Specific Function commands | Type of destination (sub) device |
|---|---|---|
| deck/player commands | | audio disk player |
| tuner commands | video tuner commands | video tuning system |
| tuner commands | audio tuner commands | audio tuner |
| text function commands | | teletext decoder |
| text function commands | | videotext decoder |
| | timer commands | timer |
| | User I/O commands | User I/O |
| Connection commands | Connection commands | Switch Box |

Each command, not belonging to the default table, must be specified by the table selector of the command table of a given apparatus.

The table selected by the avc-table-selector command is effective only for the immediately following command, data or request. After execution of that following command, data or request, the default table is effective again. For example, a deck device by default would be executing deck commands. Under control of the above selector command, it would execute one command received, for example, as a video command, such as a -crisp- control command. This selecting for one command only allows for restricting the necessary RAM capacity.

TABLE VI

| | | |
|---|---|---|
| <avc-table-command> | ::= | "B9" <avc-table '20'H ... '3F'H> |
| <avc-table> | ::= | <VIDEO TABLE '20'H><video-command> |
| | \| | <AUDIO-TABLE '21'H><audio-command> |
| | \| | <CONNECTION-TABLE '22'H> <connection-command> |
| | \| | <DECK-PLAYER-TABLE '23'H> <deck-player-command> |
| | \| | <(VIDEO)-TUNER-TABLE '24'H> <tuner-command> |
| | \| | <(TELE)TEXT-TABLE '25'H> <text-function-command> |
| | \| | <CAMERA-TABLE '30'H> <video-camera-command> |
| | \| | <TIMER-TABLE '31'H><timer-command> |
| | \| | <USER-I/O-TABLE '33'H> <user-I/O-command> |
| | \| | <TABLE-EXTENSION '3F'H> <NEW-TABLE '20'H ... '3F'H> |
| <command extension> | ::= | "BF'H" <ALIAS> |
| The command extension, followed by OPR, specifies another meaning of the next command. The command extension is valid for the following command or request. | | |
| <video-command> | ::= | <CONTRAST-command> \| ... ... \| <FIELD-ATTRIBUTE-command> |
| <audio-command> | ::= | <VOLUME-command> \| ... ... \| <AUDIO-MUTE-command> |
| <deck-player-command> | ::= | <REPEAT-command> \| ... ... \| <TAPE-MODE-command> |
| <tuner-command> | ::= | <BAND-command> \| ... ... \| <VIDEO-SYSTEM-command> |
| <text-function-command> | ::= | <MENU-command> \| ... ... \| <HALT-MODE-command> |
| <video-camera-command> | ::= | <ZOOM-command> \| ... ... \| <HEIGHT-command> |
| <timer-command> | ::= | <YEAR-command> \| ... ... \| <timer-expired-command> |
| <connection-command> | ::= | <connect-switchbox-command> \| ... ... \| <switchbox-disconnected-command> |
| <User-I/O-command> DATA: | ::= | <Display-indicator-command> |

Bytes to be sent as data are transparent bytes. How to use or interpret this data is specified within the context of the data. This can be done by preceding commands.

TABLE VII

| | | |
|---|---|---|
| <command-data-message> | ::= | <COMMAND-LOCK-TYPE> <data-command> <DATA-LOCK-TYPE> <DATA-BYTES> |

A syntax rule for the data bytes depends on the application in the receiving consumer apparatus and can be defined for each application independently. When a certain syntax is used, that syntax is specified by commands in the command-data-message.

SYNTAX OF THE REQUESTS AND PROPERTIES

All Static and Dynamic properties and characteristics are modelled in the property memory of a (sub)device (apparatus). Such a property memory may comprise the identity of the device (apparatus) (such as brand, type, version, serial no.) and the status of the device (apparatus) (stand-by, etc.) and may be a virtual memory. Each Audio/Video apparatus is implemented with a property memory. Any apparatus can have access to the property memory of another apparatus using the request message:

TABLE VIII

| | | |
|---|---|---|
| <request-message> | ::= | <WRITE-PROPERTY-MEMORY-LOCK-TYPE> <request> <READ-DATA-LOCK-TYPE><property> |

The request is terminated with the termination code "1D" to indicate that the request is completed, the slave has all information to prepare the answer. The syntax for the requests is:

TABLE IX

| | | |
|---|---|---|
| <request> | ::= | <request-code>0{request-argument>}n <terminator> |
| <terminator> | ::= | '1D'H |

The request-code is in the range of '20'H to 'FF'H. The value of the request-arguments are in the range '20'H to '7F'H. The requests are grouped to the following divisions:
1. Not Command Oriented Requests
General requests: General requests for a (sub)device, like request for the identity (brand name, type number) and general requests for status of a (sub)device. Requests are valid for all types-of (sub)devices.
Group requests: Static and Dynamic requests, valid for a group of (sub)devices.
Specific Function requests: Static and Dynamic requests, valid for one specific function.

2. Command Oriented Requests

General command oriented requests: Dynamic Requests, related to the general commands, valid for all types of (sub)devices.

Group requests: Dynamic requests, related to the group function commands, valid for a group of (sub)devices.

Specific Function requests: Dynamic requests, related to the specific function commands, valid for one specific function.

A request can be addressed to an apparatus or sub-device (using Begin 2). A service Classification Command can be used to select another table for a request.

TABLE X

| | | |
|---|---|---|
| <request-code> | ::= | <general-request> |
| | \| | <Group-request> |
| | \| | <Specific-Function-request> |
| | \| | <General-command-oriented-request> |
| | \| | <Group-function-oriented-request> |
| | \| | <Specific-Function-oriented-request> |
| <general-request '20'H ... '3F'H> | ::= | <APPARATUS-BRAND-NAME-request> ... ... <SUB-APPARATUS-STATUS-request> |
| | \| | <PLUG-NUMBER-NAME-request> ... ... <CONNECTED-SIGNALS-request> |
| <Group-request '40'H ... '5F'H> | ::= | <AVC-TABLE><video-request> |
| | \| | <audio-request> |
| | \| | <connection-request> |
| | \| | <deck-player-request> |
| | | <tuner-request> |
| | \| | <text-function-request> |
| <Specific-Function-request '60'H ... '7F'H> | ::= | <AVC-TABLE><video-camera-request> |
| | \| | <timer-request> |
| | \| | <user-I/O-request> |
| <General-command-oriented-request 'A0'H ... 'BG'H> | ::= | <AVC-TABLE><video-request> |
| | \| | <audio-request> |
| | \| | <connection-request> |
| | \| | <deck-player-request> |
| | \| | <tuner-request> |
| | \| | <text-function-request> |
| <Specific-Function-oriented-request 'E0'H ... 'FF'H> | ::= | <AVC-TABLE><video-camera-request> |
| | \| | <timer-request> |
| | \| | <user-I/O-request> |
| <video-request> | ::= | <CONTRAST-LEVEL-request> ... ... <ASPECT-RATIO-request> |
| <audio-request> | ::= | <VOLUME-LEVEL-request> ... |
| <deck-player-request> | ::= | <REPEAT-STATUS-request> ... ... <PRESENT-TAPE-TYPE-request> |
| <tuner-request> | ::= | <SATELLITE-TERRESTRIAL-request> ... ... <NUMBER-OF-PRESETS-request> |
| | \| | <CURRENT-FREQUENCY-BAND-request> ... ... <AUDIO-PRESET-request> |
| <test-function-request> | ::= | <CURRENT-PAGE-NUMBER-request> ... ... <VIDEO-TEXT-MIX-STATUS-request |
| <video-camer-request> | ::= | < > |
| <timer-request> | ::= | <NUMBER-OF-TIMER-ENTRIES-request> |
| | \| | <CURRENT-YEAR-REQUEST> ... ... <TIMER-ENTRY-request> |
| <connection-request> | ::= | <CONNECTED-TO-SWITCHBOX-request> |
| | \| | <CONNECTED-SWITCHBOX-request> |
| <user-I/O-request> | ::= | <NUMBER-OF-INDICATORS-request> ... ... <INDICATOR-PROPERTIES-request> |
| | \| | <DISPLAY-INDICATOR-request> |

The answers must be read by the master using the 'read data' control code. The syntax for the answers (properties) is:

TABLE XI

| | | |
|---|---|---|
| <property> | ::= | 0{<property-value>}n <terminator> |
| <terminator> | ::= | '1D'H |

The property values are in the range of '20'H to 'FF'H.

It is of great advantage that a request related to a command has an operation code, which is related to the operation code of the command. It is of further great advantage that a response to a request related to a command has an operand code, which is related to the operand code of the command. In the foregoing, the expression "related" includes -identity-, which means that the same operation code and operand code(s) are used for the command and the command oriented request. Whether a request or a command is sent is determined by the control bit, which is sent in advance of the command or request.

Assume the user, at apparatus 20 wants to control apparatus 24 in a particular way. The user gives some keyboard input at keyboard 26: the resulting general command consists of an operation code and one or more operand codes. Translator 28 associated with that keyboard will package these commands as a bus frame including start bit, mode bit (stating bit rate), source address, destination address, data (i.e. the command proper) and terminating bit. The command operands are specified in the description of the command table as given in the Tables above. The commands may be joined to a multiple frame message, i.e., when the message is longer than a frame. In D²B, this may occur if either the message is too long, or if the transmission falters, causing successive byte repeats.

The application message format is in the command table as "<application message>". The command is given in the command table. The command format gives a complete set of general commands. The entries accessed by the commands in the command table are data to be used by the particular intended function. However, the present disclosure does not further describe the execution of such particular functions in various apparatuses, but only the three-tiered structure of the command table for easy selection.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A control system for controlling a plurality of consumer devices included in a plurality of destination apparatuses which are coupled together via a transmission bus, a consumer device having one or more control functions, said control system comprising:

a source apparatus coupled to said transmission bus and comprising command generating means for generating a command item comprising an operation code followed by one or more command operand codes thereby to selectively address said destination apparatuses, and means for transmitting said command item over said transmission bus, and wherein each said destination apparatus includes means for receiving the command item and in response thereto accessing a local command table of an addressed destination apparatus, said local command table containing a first address category for storing general commands having a uniform meaning for all of said plurality of apparatuses and a second address category mutually exclusive of said first address category and containing group function commands having uniform meaning across a subset of all of said control functions for autonomously carrying out a particular one of the control functions of the addressed destination apparatus.

2. The control system as claimed in claim 1, wherein said local command table contains a third address category mutually exclusive to said first and second address categories and containing function specific commands, each function specific command having a specific meaning for a unique one among said control functions.

3. The control system as claimed in claim 1, wherein any operation code is different from any operand code and said command item does not include data as to specific control functions performed by said consumer devices.

4. A destination audio and/or video consumer apparatus for use in a method of controlling a plurality of interconnected audio and/or video consumer apparatuses, the destination apparatus comprising:

receiving means for receiving a message comprising a command item containing an operation code followed by a string of one or more command operand codes;

storage means for storing a local command table with a first address range for storing general commands and with a second address range, differing from the first address range, for storing group function commands having a uniform meaning across a subset of all control functions of the destination apparatus thereby to carry out a particular one of the control functions of an addressed destination apparatus; and addressing means for, under control of the command item, selectively addressing either the first address range or the second address range of the local command table.

5. An apparatus as claimed in claim 4, wherein the local command table comprises a third address range for storing specific function commands.

6. An apparatus as claimed in claim 5, comprising a switch selector which, when a selector command is received, selects one of the group function commands or specific function commands in its local command table.

7. An apparatus as claimed in claim 6, wherein the switch selector, upon absence of said selector command, activates a default table for the apparatus.

8. An apparatus as claimed in claim 7, wherein said switch selector is activated only with respect to selecting a single command outside the default table of said apparatus and thereafter directly reverting to said default table of said apparatus.

9. An apparatus as claimed in claim 6, wherein said switch selector is activated only with respect to selecting a single command outside the default table of said apparatus and thereafter directly reverting to said default table of said apparatus.

10. An apparatus as claimed in claim 5, wherein at least one group is a tuner group.

11. An apparatus as claimed in claim 5, wherein at least one group is a recorder group.

12. An apparatus as claimed in claim 5, wherein at least one group is a turntable group.

13. An apparatus as claimed in claim 5, wherein at least one group is a visual display device group.

14. An apparatus as claimed in claim 5, wherein the local command table comprises a fourth address range in which operands are stored.

15. An apparatus as claimed in claim 14, wherein the fourth address range comprises a first sub-range in which standard operand values are stored, and a second sub-range in which other operand values are stored.

16. An apparatus as claimed in claim 4, wherein at least one group is a tuner group.

17. An apparatus as claimed in claim 4, wherein at least one group is a recorder group.

18. An apparatus as claimed in claim 4, wherein at least one group is a turntable group.

19. An apparatus as claimed in claim 4, wherein at least one group is a visual display device group.

20. An apparatus as claimed in claim 4, wherein the local command table comprises a fourth address range in which operands are stored.

21. An apparatus as claimed in claim 20, wherein the fourth address range comprises a first sub-range in which standard operand values are stored, and a second sub-range in which other operand values are stored.

22. An apparatus as claimed in claim 4, wherein said apparatus further comprises an interface for interfacing to a serial D2B bus.

23. An apparatus as claimed in claim 4, wherein said apparatus further comprises an application message generating device for generating and subsequently sending to another apparatus an application message string followed by an end message item.

24. An apparatus as claimed in claim 23, wherein said application message generating device comprises a request message generating device.

25. An apparatus as claimed in claim 4, characterized in that the apparatus comprises a property memory containing data that represent characteristics of said apparatus, and that the property memory has means for, under control of a request command received, outputting a property item as specified by the request command received.

26. An apparatus as claimed in claim 25, wherein said property memory is suitable for containing both static and dynamic property items.

27. An apparatus as claimed in claim 26, wherein said property memory has various address ranges dedicated to containing property items related to general request commands and group function request commands, respectively.

28. An apparatus as claimed in claim 27, wherein the property memory is a virtual memory containing the identity of the apparatus and the status of the apparatus.

29. An apparatus as claimed in claim 26, wherein said property memory has a further address range containing property items related to function specific request commands.

30. An apparatus as claimed in claim 25, wherein said property memory has various address ranges dedicated to containing property items related to general request commands and group function request commands, respectively.

31. An apparatus as claimed in claim 30, wherein the property memory is a virtual memory containing the identity the apparatus and the status of the apparatus.

32. An apparatus as claimed in claim 4, wherein, upon receipt of a single command item by the apparatus, the apparatus includes means for executing all functions related to the command item without transmitting any signals back to a remote source of the command item.

33. A method for controlling through a network a plurality of interconnected audio and/or video consumer apparatuses encompassing a spectrum of control functions, said method comprising the steps:

in a source apparatus:
generating a command item comprising an operation code followed by a string of one or more command operand codes,
packaging said command item in a message comprising an address for selectively addressing a destination apparatus among said consumer apparatuses, and
transmitting said message over said network to said destination apparatus; and in said destination apparatus:
receiving said message and, under control of said command item, selectively addressing in a local command table either a first address range containing general commands having uniform meaning across all functions of said plurality of apparatuses, or a second address range, mutually exclusive of said first address range, and containing group function commands having uniform meaning across a subset of all of said control functions for carrying out a particular one of the control functions of an addressed destination apparatus.

34. A method as claimed in claim 33, wherein said receiving step comprises:

under control of said command item, selectively addressing, in said local command table, either said first address range containing general commands having uniform meaning across all functions of said plurality of apparatuses, said second address range, mutually exclusive of said first address range, containing group function commands having uniform meaning across a subset of all of said functions, or a third address range, mutually exclusive of said first and second address ranges and containing function specific commands, each function specific command having a specific meaning for a unique one among said functions.

35. A method as claimed in claim 34, wherein any operation code is different from any operand code.

36. A method as claimed in claim 33, wherein any operation code is different from any operand code.

37. A method as claimed in claim 33, wherein a request related to a command item has an operation code, which is related to the operation code of said command item.

38. A method as claimed in claim 37, wherein a response to a request related to a command item has an operand code, which is related to the operand code of said command item.

39. A method as claimed in claim 33, wherein a command item of a message puts a destination audio and/or video consumer apparatus in a mode defined by said command item of said message, whereby after said message, transparent data are sent to said apparatus and said apparatus processes said data using a syntax defined by said mode.

40. A method as claimed in claim 33, wherein the transmitting of messages is performed in a serial manner.

* * * * *